United States Patent
Viaux

(10) Patent No.: US 11,103,911 B2
(45) Date of Patent: Aug. 31, 2021

(54) METHOD FOR PRODUCING AN AUTOMOTIVE STRUCTURAL PART COMPRISING A LOWERSIDE SILL AND A LOWER FRONT PILLAR

(71) Applicant: ArcelorMittal, Luxembourg (LU)

(72) Inventor: Ivan Viaux, Paris (FR)

(73) Assignee: ARCELORMITTAL, Luxembourg (LU)

( * ) Notice: Subject to any disclaimer, the term of this patent is extended or adjusted under 35 U.S.C. 154(b) by 397 days.

(21) Appl. No.: 15/780,206

(22) PCT Filed: Dec. 9, 2016

(86) PCT No.: PCT/EP2016/002077
§ 371 (c)(1),
(2) Date: May 30, 2018

(87) PCT Pub. No.: WO2017/097425
PCT Pub. Date: Jun. 15, 2017

(65) Prior Publication Data
US 2018/0354013 A1    Dec. 13, 2018

(30) Foreign Application Priority Data

Dec. 9, 2015  (WO) .................. PCT/IB2015/059484

(51) Int. Cl.
*B21D 22/02*    (2006.01)
*B62D 25/02*    (2006.01)
(Continued)

(52) U.S. Cl.
CPC .......... *B21D 22/022* (2013.01); *B21D 47/01* (2013.01); *B21D 53/88* (2013.01); *B62D 25/02* (2013.01);
(Continued)

(58) Field of Classification Search
CPC .......... B62D 25/02–025; B21D 22/022; B21D 47/01; B21D 53/88; C22C 38/00;
(Continued)

(56) References Cited

U.S. PATENT DOCUMENTS

| 2005/0189790 A1 | 9/2005 | Chernoff et al. |
| 2006/0097549 A1 | 5/2006 | Fischer et al. |

(Continued)

FOREIGN PATENT DOCUMENTS

| CA | 2624960 A1 | 4/2007 |
| CN | 104527803 A | 4/2015 |

(Continued)

OTHER PUBLICATIONS

Guler H.; "Investigation of Usibor Formability in a Hot Forming Operation", Materials Science, vol. 19, No. 2, 2013 (Year: 2013).*

(Continued)

*Primary Examiner* — Alexandra M Moore
*Assistant Examiner* — Austin Pollock
(74) *Attorney, Agent, or Firm* — Davidson, Davidson & Kappel, LLC

(57) ABSTRACT

A method containing the steps of: providing an inner structural part blank having a L-shape and an outer structural part blank having a L-shape, the inner and outer structural part blanks being substantially planar; hot stamping the inner structural part blank to form an inner automotive structural part having an inner lowerside sill part and an inner lower front pillar part made of a single part with the inner lowerside sill part; hot stamping the outer structural part blank to form an outer automotive structural part having an outer lowerside sill part and an outer lower front pillar part made of a single part with the outer lowerside sill part; and (Continued)

assembling the inner automotive structural part and the outer automotive structural part to form the automotive structural part.

8 Claims, 2 Drawing Sheets

(51) Int. Cl.

| | | |
|---|---|---|
| *B21D 53/88* | (2006.01) | |
| *C21D 9/50* | (2006.01) | |
| *C21D 1/673* | (2006.01) | |
| *C22C 38/04* | (2006.01) | |
| *C22C 38/00* | (2006.01) | |
| *B21D 47/01* | (2006.01) | |
| *B62D 25/04* | (2006.01) | |
| *B62D 65/02* | (2006.01) | |
| *C21D 6/00* | (2006.01) | |
| *C22C 38/02* | (2006.01) | |
| *C22C 38/06* | (2006.01) | |
| *C22C 38/28* | (2006.01) | |

(52) U.S. Cl.
CPC ........... *B62D 25/025* (2013.01); *B62D 25/04* (2013.01); *B62D 65/02* (2013.01); *C21D 1/673* (2013.01); *C21D 6/002* (2013.01); *C21D 6/005* (2013.01); *C21D 6/008* (2013.01); *C21D 9/50* (2013.01); *C22C 38/00* (2013.01); *C22C 38/001* (2013.01); *C22C 38/002* (2013.01); *C22C 38/02* (2013.01); *C22C 38/04* (2013.01); *C22C 38/06* (2013.01); *C22C 38/28* (2013.01); *C21D 2211/008* (2013.01)

(58) Field of Classification Search
CPC ..... C22C 38/001; C22C 38/002; C22C 38/02; C22C 38/06; C22C 38/28
See application file for complete search history.

(56) References Cited

U.S. PATENT DOCUMENTS

| | | | | |
|---|---|---|---|---|
| 2007/0074556 | A1* | 4/2007 | Heatherington | B21C 37/185 72/177 |
| 2010/0259022 | A1* | 10/2010 | Zhong | B60B 33/0057 280/47.34 |
| 2011/0233970 | A1* | 9/2011 | Nagai | B62D 25/02 296/203.03 |
| 2012/0119546 | A1 | 5/2012 | Honda et al. | |
| 2012/0299334 | A1* | 11/2012 | Takayama | B62D 25/2081 296/193.06 |
| 2012/0319431 | A1 | 12/2012 | Bodin et al. | |
| 2012/0319432 | A1 | 12/2012 | Bodin et al. | |
| 2014/0152053 | A1* | 6/2014 | Watanabe | B62D 25/025 296/193.06 |
| 2014/0319877 | A1 | 10/2014 | Hida | |
| 2015/0284028 | A1* | 10/2015 | Yamada | B62D 25/06 403/272 |
| 2015/0292075 | A1 | 10/2015 | Schleichert et al. | |
| 2016/0010171 | A1 | 1/2016 | Naitou et al. | |
| 2016/0017452 | A1 | 1/2016 | Puerta Velasquez et al. | |
| 2016/0046328 | A1 | 2/2016 | Steffens et al. | |
| 2017/0233007 | A1* | 8/2017 | Park | B62D 25/04 296/203.03 |

FOREIGN PATENT DOCUMENTS

| | | |
|---|---|---|
| DE | 102011117951 A1 | 5/2012 |
| DE | 102013214796 A1 | 1/2015 |
| DE | 102014102372 A | 8/2015 |
| DE | 102014106356 A | 11/2015 |
| JP | H04215570 A | 8/1992 |
| JP | 2001180518 A | 7/2001 |
| JP | 2011195103 A | 10/2011 |
| JP | 2011195107 A | 10/2011 |
| JP | 2013513514 A | 4/2013 |
| RU | 94041539 A | 9/1996 |
| RU | 28666 U1 | 4/2003 |
| WO | WO2015033177 A | 3/2015 |

OTHER PUBLICATIONS

Hongtu S., et al.; "Application of Hot Forming High Strength Steel Parts on Car Body in Side Impact", Chinese Journal of Mechanical Engineering, vol. 24, 2010 (Year: 2010).*

Katayama S.; "Handbook of Laser Welding Technologies", Chapter 2.6.1, 2013 (Year: 2013).*

The International Search Report issued in connection with International Application No. PCT/EP2016/002077 dated Nov. 4, 2017.

The International Search Report issued in connection with International Application No. PCT/IB2015/059484 dated Aug. 29, 2016.

English Absract of JP2001180518, Jul. 3, 2001.

English Absract of JPH04215570, Aug. 6, 1992.

"China's Automotive Lightweight Development Strategy and Path", Oct. 31, 2015, Beijing Institute of Technology Press, pp. 143 to 146 (and an English translation thereof).

* cited by examiner

… (US 11,103,911 B2)

METHOD FOR PRODUCING AN AUTOMOTIVE STRUCTURAL PART COMPRISING A LOWERSIDE SILL AND A LOWER FRONT PILLAR

FIELD OF THE INVENTION

The present invention relates to a method for producing an automotive structural type of the type comprising a lowerside sill extending between a rear end and a front end and a lower front pillar extending substantially perpendicularly from the front end of the lowerside sill.

The invention also relates to an automotive structural part obtained by such a method.

BACKGROUND OF THE INVENTION

The automotive structural part of the invention is intended to form the lower part of the front door ring of an automotive vehicle. Such a structural part has to have a high resistance to plastic deformation in case of an impact, for example a front or side impact, against the vehicle to prevent any intrusion in the passenger compartment in order to protect the passengers of the vehicle. Consequently, the front pillar and the lowerside sill are made in a material having a high tensile and yield strength to be substantially underformable in case of an impact.

However, a weak point remains at the junction area between the lowerside sill and the lower front pillar since these two parts are welded together in the junction area. Consequently, in case of an impact, the junction area could be deformed or the junction between the lower front pillar and the lowerside sill could even break.

BRIEF SUMMARY OF THE INVENTION

One of the objects of the invention is to overcome this draw back by providing a method for producing an automotive structural part improving the junction between the lowerside sill and the lower front pillar.

The present invention provides a method for producing an automotive structural part of the afore-mentioned type, wherein the method comprising the steps of:

providing an inner structural part blank having a L-shape and an outer structural part blank having a L-shape, said inner and outer structural part blanks being substantially planar, hot stamping the inner structural part blank to form an inner automotive structural part having an inner lowerside sill part and an inner lower front pillar part made of a single part with the inner lowerside sill part, hot stamping the outer structural part blank to form an outer automotive structural part having an outer lowerside sill part and an outer lower front pillar part made of a single part with the outer lowerside sill part, assembling the inner automotive structural part and the outer automotive structural part to form the automotive structural part.

Using L-shaped blanks allows forming the inner lowerside sill part in a single piece with the inner lower front pillar part and the outer lowerside sill part in a single piece with the outer front pillar part. Consequently, the junction between the lower front pillar and the lowerside sill is more robust because the assembly plane between the lower front pillar and the lowerside sill is extended over the whole automotive structural part between the inner structural part and the outer structural part. The automotive structural part is therefore more resistant to plastic deformation and its behavior in case of an impact is improved.

In additional embodiments, the method comprises one or more of the following features, considered alone or according to any technically possible combination:

the inner structural part blank and the outer structural part blank have a structure consisting essentially of ferrite and perlite before said blanks are hot stamped, the inner automotive structural part and the automotive outer structural part having a structure consisting of 95% or more of martensite after hot stamping;

the inner automotive structural part and the outer automotive structural part are each made of a press hardened steel part having a tensile strength greater than 1200 MPa;

the composition of the press hardened steel comprises in % weight:

$0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration or $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration;

or $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration.

the outer structural part blank is hot-stamped to obtain a U-shape cross-section forming a cavity, the inner automotive structural part being arranged to close said cavity;

the inner automotive structural part and the outer automotive structural part are laser welded together to form the automotive structural part.

The invention also provides an automotive structural part of the type comprising a lowerside sill, extending between a rear end and a front end, and a lower front pillar extending substantially perpendicularly from the front end of the lowerside sill, wherein the automotive structural part is formed by the assembly of a single inner structural part and of a single outer automotive structural part assembled together along an assembly plane.

In certain embodiments, the automotive structural part comprises one or more of the following features, considered alone or according to any technically possible combination:

the inner automotive structural part comprises an inner lowerside sill part and an inner lower front pillar part made in a single part with the inner lowerside sill part and wherein the outer automotive structural part comprises an outer lowerside sill part and an outer lower front pillar part made in a single part with the outer lowerside sill part;

the cross-section of the outer automotive structural part in a plane substantially perpendicular to the assembly plane forms a cavity, said cavity being closed by the cross-section of the inner automotive structural part in said plane;

the automotive structural part is a hollow tubular element, wherein the lowerside sill extends along a longitudinal axis and the lower front pillar extends along an elevation axis, substantially perpendicular to the longitudinal axis;

the automotive structural part is obtained by a method as described above.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

Figure 1:
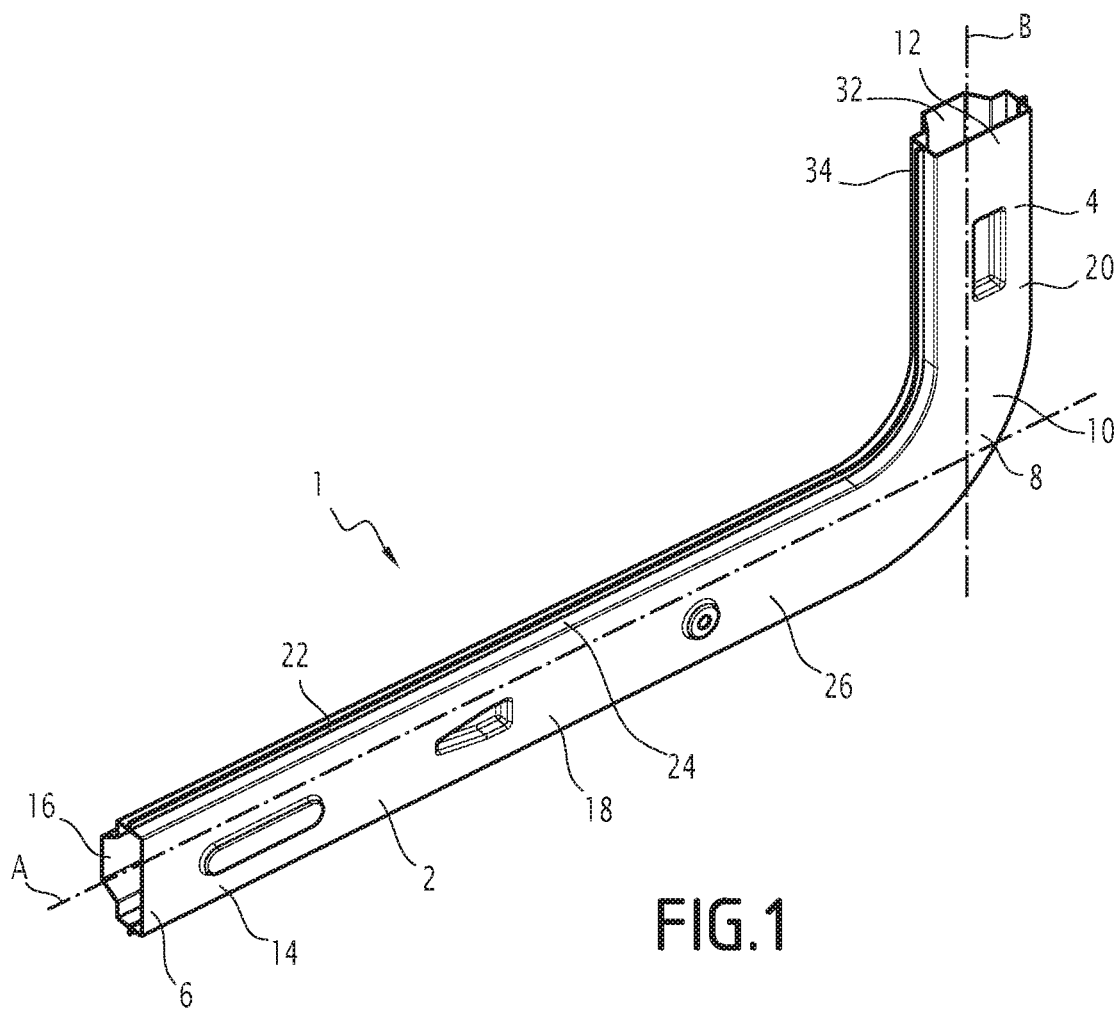
FIG. 1 is a perspective view of the automotive structural part according to the invention.

In the following description, the term "longitudinal" refers to the rear-front direction and the term "transversal" refers to the left-right direction of an automotive vehicle in regular use condition. The terms "rear" and "front" are defined relative to the longitudinal direction and the terms "upper" and "lower" are defined relative to the elevation direction of an automotive vehicle in regular use condition. The terms "inner" and "outer" are defined relative to the interior and to the exterior of an automotive vehicle. "Inner" defines what is turned toward the interior of the vehicle, and "outer" defines what is turned toward the exterior of the vehicle.

In certain embodiments, the invention provides a method for producing an automotive structural part 1 comprising a lowerside sill 2 and a lower front pillar 4.

Such an automotive structural part 1 is intended to form, with an upper automotive structural part, a side structure of a vehicle such as one or more door ring arranged to support the doors of the vehicle and to protect the passenger compartment by preventing intrusions of any kind in the passenger compartment in case of an impact, for example a front or side impact.

The lowerside sill 2 extends in a longitudinal direction between a rear end 6 and a front end 8 along a longitudinal axis A. The lowerside sill 2 for example extends along the whole length of the passenger in the longitudinal direction. Such a lowerside sill 2 is intended to extend adjacent to a side of a floor panel of the automotive vehicle and to form the lowermost part of the door ring.

The lower front pillar 4 extends in an elevation direction along an elevation axis B substantially perpendicular to the longitudinal axis A. The lower front pillar 4 extends at the front of the vehicle between a lower end 10 and an upper end 12. The lower end 10 is adjacent to the front end 6 of the lowerside sill 2, meaning that the lower front pillar 4 extends from the front end 6 of the lowerside sill 2. The lower front pillar 4 is intended to support the inner transversal crossmember of the vehicle extending transversally between the lower front pillar 4 of a left automotive structural part and the lower front pillar of a right automotive structural part and arranged to support the steering column and other functional elements of the vehicle. The lower front pillar 4 is also intended to support an upper fender rail, also called "shotgun rail", extending in front of the passenger compartment to support a fender of the vehicle.

The automotive structural part 1 is a hollow tubular member extending along the longitudinal axis A along the lowerside sill 2 and along the elevation axis B along the lower front pillar 4. By tubular member, it is meant that the automotive structural part 1 has a closed cross-section, for example a polygonal cross-section, in planes perpendicular to the longitudinal axis A along the lowerside sill and perpendicular to the elevation axis B along the lower front pillar.

The automotive structural part 1 is made of an inner automotive structural part 14 and of an outer structural part 16 (FIG. 3) assembled together in an assembly plane containing the longitudinal axis A and the elevation axis B.

The inner automotive structural part 14 comprises an inner lowerside sill part 18 and an inner lower front pillar part 20. The inner lowerside sill part 18 and the inner lower front pillar part 20 are integral, meaning that the inner lower front pillar part 20 is made in a single part with the inner lowerside sill part 18. By single part, it is meant that the inner lower lowerside sill part 18 and inner lower front pillar part 20 are made from the same blank, as will be described subsequently, and that there is no attachment step, such as a welding step, between the inner lowerside sill part 18 and the inner lower front pillar part 20. The inner automotive structural part 14 is substantially planar and comprises welding tabs 22 extending in the assembly plane on either side of the inner lowerside sill part 18 and of the inner lower front part 20. In the embodiment shown in the figures, the inner automotive structural part 14 is slightly recessed and comprises side wings 24 extending perpendicularly from the assembly plane and carrying the welding tabs 22. The side wings 24 extend perpendicularly from an inner flank 26 extending in a plane parallel to the assembly plane and forming the main surface of the inner automotive structural part 14. In the case where the inner automotive structural part 14 is planar, the inner flank 26 extends substantially in the assembly plane and directly carries the welding tabs 22.

Figure 3:
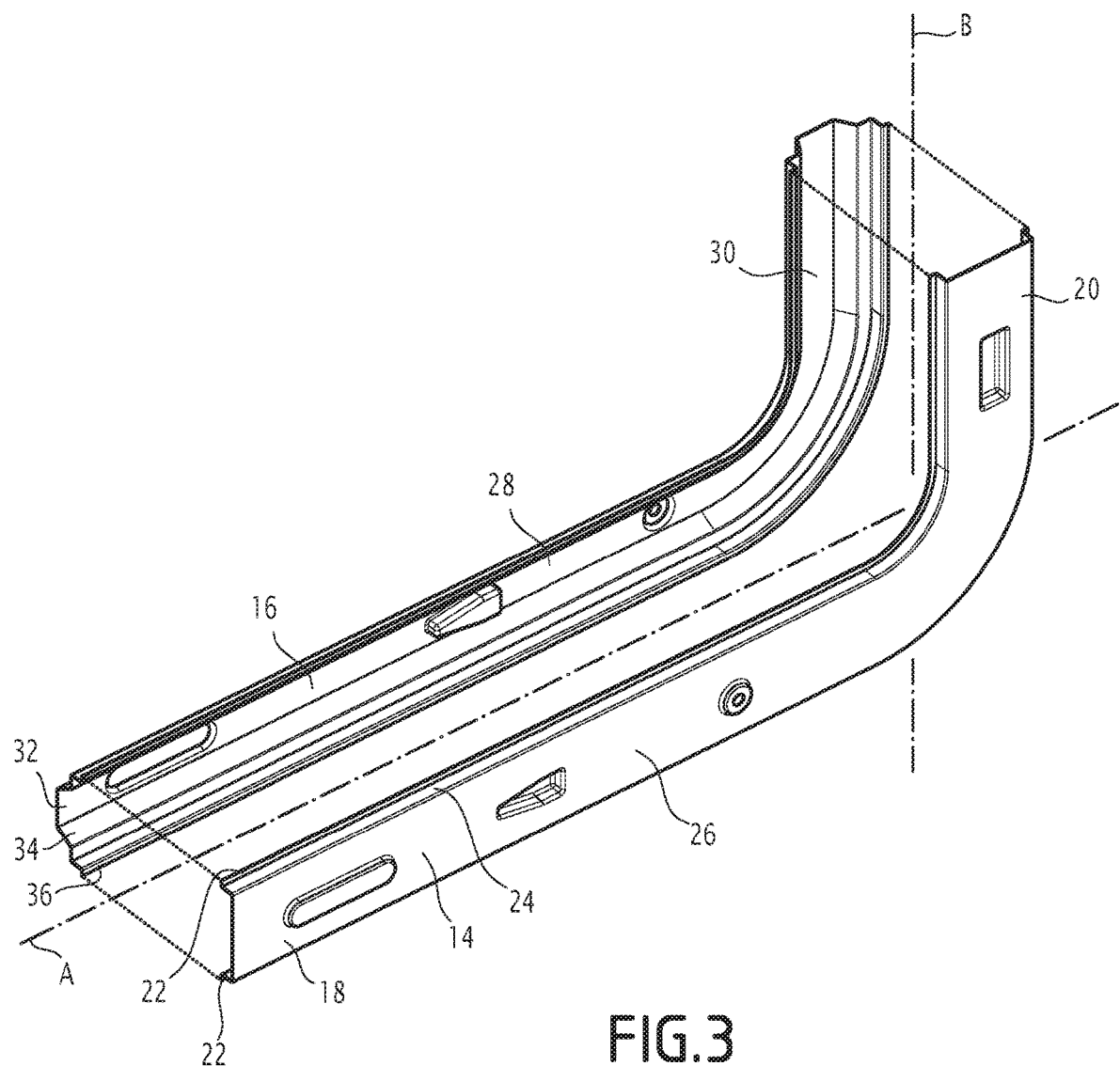
FIG. 3 is a perspective view of the inner automotive structural part and of the outer structural part obtained by hot-stamping L-shaped blanks of FIG. 2.

The outer automotive structural part 16 comprises an outer lowerside sill part 28 and an outer lower front pillar part 30. The outer lowerside sill part 28 and the outer lower front pillar part 30 are integral, meaning that the outer lower front pillar part 30 is made in a single part with the outer lowerside sill part 28. By single part, it is meant that the outer lower lowerside sill part 28 and outer lower front pillar part 30 are made from the same blank, as will be described subsequently, and that there is no attachment step, such as a welding step, between the outer lowerside sill part 28 and the outer lower front pillar part 30. The outer automotive structural part 16 has, according to the embodiment shown in the figures, a substantially U-shaped cross-section and comprises an outer flank 32 extending in a plane parallel to the assembly plane and side wings 34 extending from the outer flank 32 to the assembly plane on either side of said outer flank 32. The side wings 34 carry welding tabs 36 extending in the assembly plane. The side wings 34 can be of various shapes such as a planar shape extending in a plane perpendicular to the assembly plane or a more complex shape with branches extending in different planes, as shown in FIGS. 1 and 3. The outer automotive structural part 16 thus defines a cavity opened towards the assembly plane and delimited by the outer flank 32 and by the side wings 34.

The inner automotive structural part 14 is arranged to close the cavity defined by the outer structural part 16 when the inner automotive structural part 14 is attached to the outer structural part 16, as shown in FIG. 1. Consequently, the closed cross-section of the automotive structural part 1 is defined by the cross-section of the inner automotive structural part 14 and by the cross-section of the outer automotive structural part 16.

The method for producing the above-described automotive structural part 1 will now be described.

Figure 2:
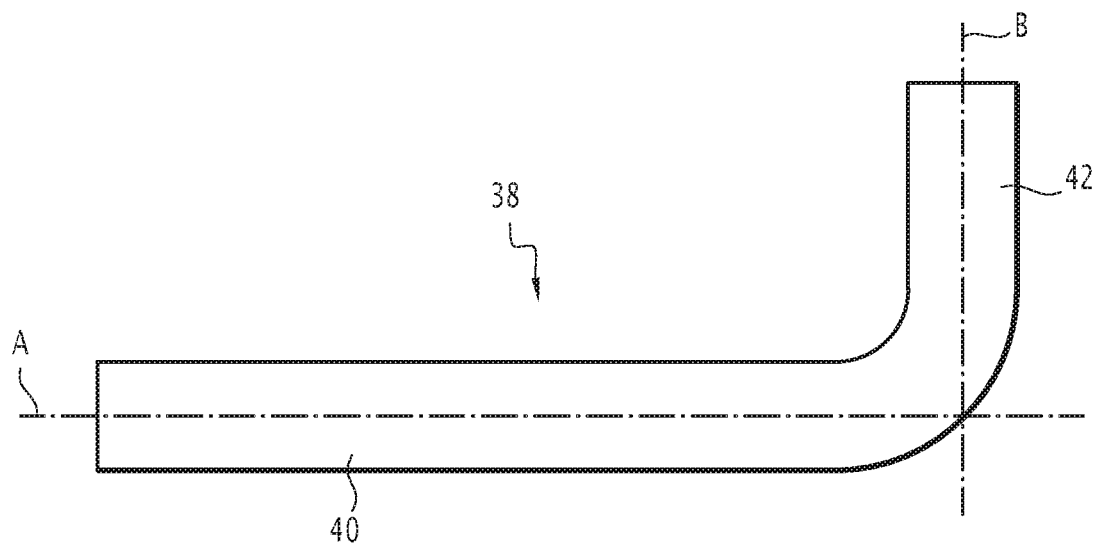
FIG. 2 is a front view of an L-shaped blank used in the method according the invention.

An inner structural part blank and an outer structural part blank are first provided. Since the inner and outer structural part blank have the same shape, apart from dimensional considerations. Consequently, only one blank 38, shown in FIG. 2 will be described.

The blank is made from a steel sheet and is for example laser cut into shape from the steel sheet. The steel has for example a structure consisting essentially of ferrite and perlite before said blanks are hot stamped. This structure is arranged such that the inner structural part 14 and the outer structural part 16 have a structure consisting of 95% or more of martensite after hot stamping. Consequently, the inner structural part 14 and the outer structural part 16 are made of a press hardened steel part. The press hardened steel has preferably a tensile strength greater than the 1200 Mpa.

The composition of such steel may comprise for example, in % weight: $0.15\% \leq C \leq 0.5\%$, $0.5\% \leq Mn \leq 3\%$, $0.1\% \leq Si \leq 1\%$, $0.005\% \leq Cr \leq 1\%$, $Ti \leq 0.2\%$, $Al \leq 0.1\%$, $S \leq 0.05\%$, $P \leq 0.1\%$, $B \leq 0.010\%$, the remainder being iron and unavoidable impurities resulting from the elaboration.

According to another preferred embodiment, the steel composition comprises for example, in % weight: $0.20\% \leq C \leq 0.25\%$, $1.1\% \leq Mn \leq 1.4\%$, $0.15\% \leq Si \leq 0.35\%$, $\leq Cr \leq 0.30\%$, $0.020\% \leq Ti \leq 0.060\%$, $0.020\% \leq Al \leq 0.060\%$, $S \leq 0.005\%$, $P \leq 0.025\%$, $0.002\% \leq B \leq 0.004\%$, the remainder being iron and unavoidable impurities resulting from the elaboration. With this composition range, the tensile strength of the press hardened part is comprised between 1300 and 1650 MPa.

According to another preferred embodiment, the steel composition comprises for example, in % weight: $0.24\% \leq C \leq 0.38\%$, $0.40\% \leq Mn \leq 3\%$, $0.10\% \leq Si \leq 0.70\%$, $0.015\% \leq Al \leq 0.070\%$, $Cr \leq 2\%$, $0.25\% \leq Ni \leq 2\%$, $0.015\% \leq Ti \leq 0.10\%$, $Nb \leq 0.060\%$, $0.0005\% \leq B \leq 0.0040\%$, $0.003\% \leq N \leq 0.010\%$, $S \leq 0.005\%$, $P \leq 0.025\%$, %, the remainder being iron and unavoidable impurities resulting from the elaboration. With this composition range, the tensile strength of the press hardened part is higher than 1800 MPa.

While the inner structural part blank and the outer structural part blank are described as being made of the same material, it should be understood that the invention is not limited to such an embodiment. The blanks could be made of different material, for example of different grades of steel, to confer different mechanical properties to the inner and outer automotive structural parts. According to an example, the material of the inner structural part blank and the material of the outer structural blank could be chosen such that the outer automotive structural part 16 has a tensile strength greater than the tensile strength of the inner automotive structural part.

The thickness of the blank 38 is for example comprised between 0.7 and 3 mm. The thickness of the inner structural part blank could also be different from the thickness of the outer structural part blank, for example inferior to said thickness in order to confer different mechanical properties to the inner automotive structural part 14 and to the outer automotive structural part 16.

The blank 38 is substantially planar. The blank 38 presents the shape of an L and comprises a lowerside sill branch 40 and a lower front pillar branch 42. The lower side sill branch 40 extends along an axis A corresponding to the longitudinal axis and has a length, measured along axis A, equal to the length of the lowerside sill 2. The lower front pillar branch 42 extends from one end of the lowerside sill branch 40 along an axis B, corresponding to the elevation axis and substantially perpendicular to axis A. The length of the lower front pillar branch 42, measured along axis B, is equal to the length of the lower front pillar 4. The width of the blank 38, measured along a direction perpendicular to axis A in the lowerside sill branch 40 and along a direction perpendicular to axis B in the lower front pillar branch 42, is substantially equal to the added widths of the inner blank 26, side wings 24 and welding tabs 22 for the inner structural part blank and to the added widths of the outer blank 32, side wings 34 and welding tabs 36 for the outer structural part blank.

The inner structural part blank is hot stamped to form the inner automotive structural part 14. More particularly, hot stamping the lowerside sill branch 40 of this blank forms the inner lowerside sill part 18 and hot stamping the lower front pillar branch 42 forms the inner lower front pillar part 20. Consequently, the inner automotive structural part 14 is obtained from a single blank.

The outer structural part blank is hot stamped to form the outer automotive structural part 16. More particularly, hot stamping the lowerside sill branch 40 of this blank forms the outer lowerside sill part 28 and hot stamping the lower front pillar branch 42 forms the outer lower front pillar part 30. Consequently, the outer structural part 16 is obtained from a single blank.

The inner automotive structural part 14 and the outer structural part 16 are then attached together in the assembly plane by attaching the welding tabs 22 of the inner automotive structural part and the welding tabs 36 of the outer automotive structural part together. This attachment is for example obtained by laser welding.

Consequently, the automotive structural part 1 is made of the assembly of a single inner automotive structural part 14 and of a single outer structural part 16.

The production of the automotive structural part 1 is therefore made simpler since it requires the hot stamping and assembly of two blanks only. Furthermore, a step of attaching the lower front pillar to the lowerside sill is not required since these parts are made integral.

Furthermore, the obtained automotive structural part 1 is more robust and more resistant to plastic deformation since there is no weakness point at the junction between the lowerside sill 2 and the lower front pillar 4. The attachment between the inner automotive structural part 14 and the outer automotive structural part 16 is distributed over the whole length of the lowerside sill 4 and of the lower front pillar 4. Consequently, the obtained automotive structural part 1 is well adapted to resist an impact against the automotive vehicle and to prevent any kind of intrusion in the passenger compartment.

The invention claimed is:

1. A method for producing an automotive structural part comprising a lowerside sill extending between a rear end and a front end and a lower front pillar extending perpendicularly from the front end of the lowerside sill, wherein the method comprises the steps of:

provide an inner structural part blank having a L-shape and an outer structural part blank having a L-shape, said inner and outer structural part blanks being planar, hot stamping the inner structural part blank to form an inner automotive structural part having an inner lowerside sill part and an inner lower front pillar part made of a single part with the inner lowerside sill part, hot stamping the outer structural part blank to form an outer automotive structural part having an outer lowerside sill part and an outer lower front pillar part made of a single part with the outer lowerside sill part, assembling the inner automotive structural part and the outer automotive structural part to form the automotive structural part,
wherein a material of the outer structural part blank has a tensile strength greater than a tensile strength of a material of the inner structural part blank.

2. The method according to claim 1, wherein the outer structural part blank is hot-stamped to obtain a U-shape cross-section forming a cavity, the inner automotive structural part being arranged to close said cavity.

3. The method according to claim 1, wherein the inner automotive structural part and the outer automotive structural part are laser welded together to form the automotive structural part.

4. The method according to claim 1, wherein a thickness of the inner structural part blank is inferior to a thickness of the outer structural part blank.

5. The method according to claim 1, wherein the inner structural part blank and the outer structural part blank have a structure consisting essentially of ferrite and pearlite before said blanks are hot stamped, the inner automotive structural part and the automotive outer structural part having a structure including 95% or more of martensite after hot stamping.

6. The method according to claim 5, wherein the inner automotive structural part and the outer automotive structural part are each made of a press hardened steel part having a tensile strength greater than 1200 MPa.

7. The method according to claim 6, wherein the composition of the press hardened steel comprises in % weight:
0.15%≤C≤0.5%, 0.5%≤Mn≤3%, 0.1%≤Si≤1%, 0.005%≤Cr≤1%, Ti≤0.2%, Al ≤0.1%, S≤0.05%, P≤0.1%, B≤0.010%, the remainder being iron and unavoidable impurities resulting from production; or
0.20%≤C≤0.25%, 1.1%≤Mn≤1.4%, 0.15%≤Si≤0.35%, Cr≤0.30%, 0.020%≤Ti ≤0.060%, 0.020%≤Al≤0.060%, S≤0.005%, P≤0.025%, 0.002%≤B≤0.004%, the remainder being iron and unavoidable impurities resulting from production; or
0.24%≤C≤0.38%, 0.40%≤Mn≤3%, 0.10%≤Si≤0.70%, 0.015%≤Al≤0.070%, Cr ≤2%, 0.25%≤Ni≤2%, 0.015%≤Ti≤0.10%, Nb≤0.060%, 0.0005%≤B≤0.0040%, 0.003%≤N≤0.010%, S≤0.005%, P≤0.025%, the remainder being iron and unavoidable impurities resulting from production.

8. A method for producing an automotive structural part comprising a lowerside sill extending between a rear end and a front end and a lower front pillar extending perpendicularly from the front end of the lowerside sill, wherein the method comprises the steps of:
providing an inner structural part blank having a L-shape and an outer structural part blank having a L-shape, said inner and outer structural part blanks being planar,
hot stamping the inner structural part blank to form an inner automotive structural part having an inner lowerside sill part and an inner lower front pillar part made of a single part with the inner lowerside sill part,
hot stamping the outer structural part blank to form an outer automotive structural part having an outer lowerside sill part and an outer lower front pillar part made of a single part with the outer lowerside sill part,
assembling the inner automotive structural part and the outer automotive structural part to form the automotive structural part,
wherein a thickness of the inner structural part blank is inferior to a thickness of the outer structural part blank.

* * * * *